Sept. 28, 1954 E. N. JACOBI 2,690,071
WEATHER SEALED LOCK MECHANISM
Filed April 11, 1951
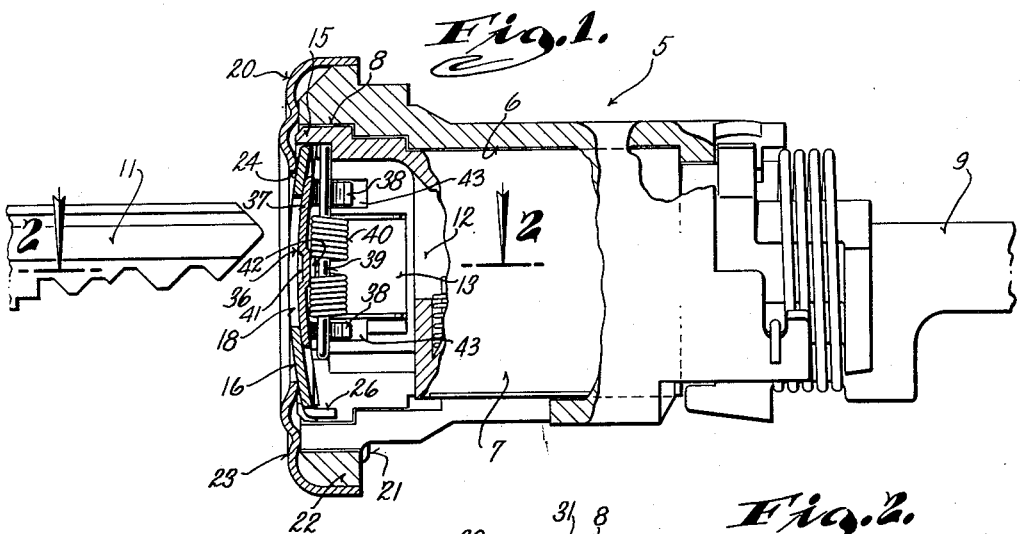
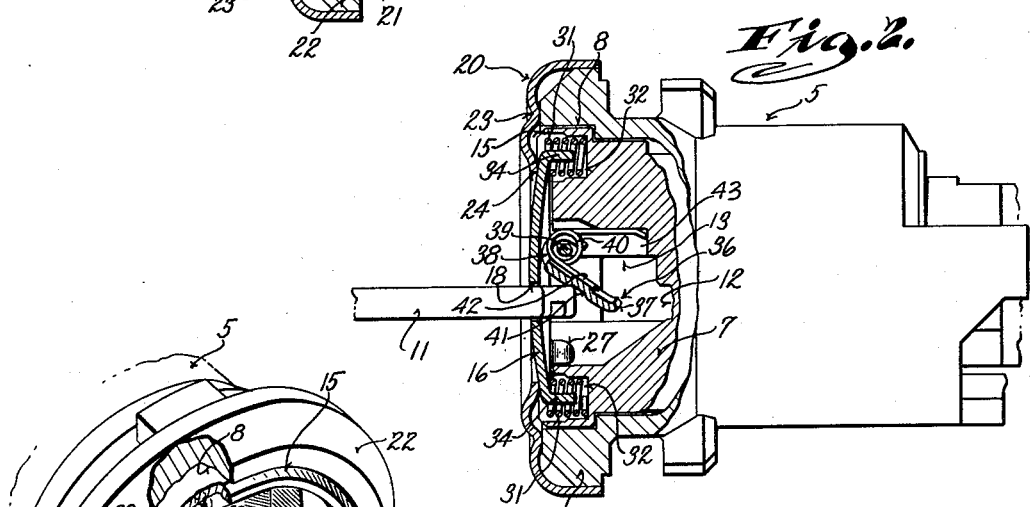
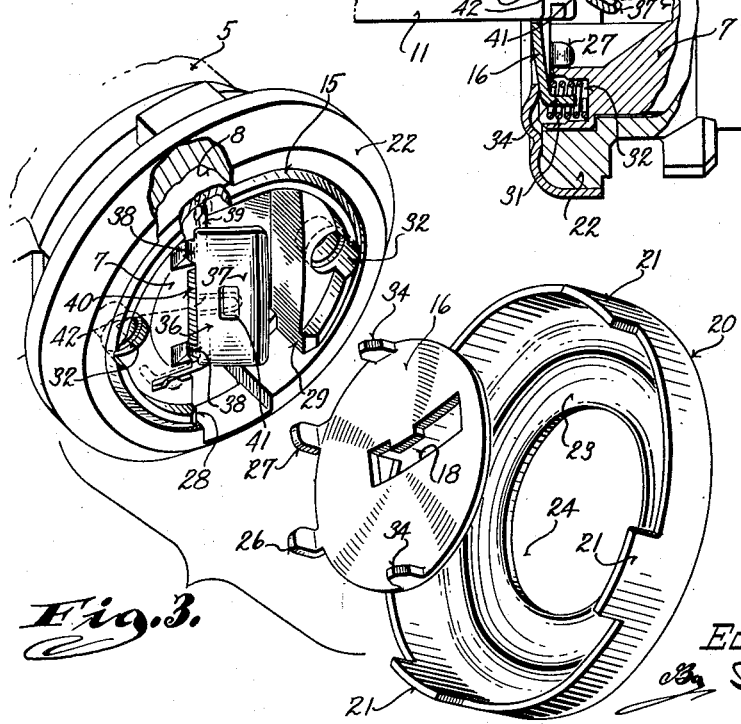
Edward N. Jacobi Patented Sept. 28, 1954

2,690,071

UNITED STATES PATENT OFFICE 2,690,071

WEATHER SEALED LOCK MECHANISM

Edward N. Jacobi, Milwaukee, Wis., assignor to Briggs & Stratton Corporation, Milwaukee, Wis., a corporation of Delaware Application April 11, 1951, Serial No. 220,432

14 Claims. (Cl. 70—455)

This invention relates to lock mechanisms of the type generally used on doors and deck covers of automotive vehicles, and has as its primary objective the provision of sealing means for preventing ingress of dust and moisture into the lock mechanism to thus assure the operativeness of the mechanism under all weather conditions.

In the past lock mechanisms generally employed on the doors and deck covers of automotive vehicles have comprised a lock cylinder rotatably mounted in a lock body and having a key slot accessible from the exterior of the door. Many locks of this type have been provided with dust covers which were usually of the type which engaged over the entire front of the lock body to close the mouth of the cylinder bore therein and were pivotally connected to the body either for edgewise swinging motion in a plane normal to the axis of rotation of the lock cylinder or for flatwise motion toward and from the front of the body.

While these dust covers were quite effective in keeping dust and other foreign solid matter from entering the lock mechanism, they were not always water tight in the sense that they prevented ingress of water or moisture into the lock mechanism. This, of course, is highly objectionable especially in climates where freezing temperatures might follow rainy weather, and the lock cylinder is apt to freeze tightly in its bore.

With this shortcoming of past constructions in mind it is the primary purpose of this invention to provide an improved sealing means for more effectively closing the front of a lock mechanism such as is used on doors and deck covers of automobiles against ingress of moisture as well as dust and other solid matter into the mechanism.

More specifically it is a purpose of this invention to provide weather sealing means for lock mechanisms such as are used on the doors and deck covers of automotive vehicles, which sealing means achieves the advantages of simplicity and low cost of manufacture without loss of effectiveness.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a view of a lock mechanism embodying the weather sealing means of this invention, portions of the lock mechanism being shown in side elevation and portions being broken away and shown in longitudinal section;

Figure 2 is a view similar to Figure 1 taken along the line 2—2 of Figure 1; and Figure 3 is an exploded perspective view showing the component parts of the weather sealing means separated from the front of the lock cylinder but in their proper order of assembly therewith.

Referring now more particularly to the accompanying drawing in which like numerals indicate like parts throughout the several views the numeral 5 generally designates the body of a lock mechanism such as commonly used on the doors and deck covers particularly, of automotive vehicles. The body is provided with a bore 6 to rotatably receive the lock cylinder 7 of the mechanism, and it will be noted that the bore opens to the front of the body preferably, though not necessarily, through a counterbore 8; and that the front end of the lock cylinder is enlarged to substantially fit the counterbore.

The lock cylinder projects from the rear of the lock body 5 to be connected with an operating shaft 9 by which rotation of the lock cylinder may be transmitted to the latch mechanism on the door or deck cover. The details of the driving connection between the cylinder and the operating shaft form no part of this invention, and for a complete description thereof reference may be had to the co-pending application of Edward N. Jacobi Serial No. 166,088 filed June 5, 1950.

The lock cylinder, of course, has tumblers (not shown) which are operated by a proper key, a portion of which is indicated at 11, insertable into a key slot 12 in the cylinder opening to the front thereof. In the present case, the key slot 12 is enlarged laterally at the front of the cylinder for a purpose to be later described.

At the front of the lock cylinder its peripheral portion is extended forwardly to provide a circumferential rim 15 extending nearly entirely around the cylinder. The rim 15 thus defines a relatively large diameter well in the front face of the lock cylinder in which the valve-like sealing member 16 of this invention is received. The sealing member 16 is in the form of a disc or cap of circular outline as seen best in Figure 3, and preferably, though not necessarily, is formed of a relatively stiff piece of stainless sheet steel of spherical configuration with the convex side thereof facing forwardly out of the well defined by the rim 15. The diameter of the cap is approximately equal to the diameter of the well provided by the circumferential rim 15 so that the latter holds the cap coaxial with the lock cylinder and against lateral shifting relative thereto.

The cap 16, of course, extends transversely across the front face of the lock cylinder and has a generally rectangular key opening 18 therein of a size and shape to receive the key 11 and guide its entrance into the key slot 12 of the cylinder with which the opening 18 aligns.

The cap 16 is retained in place on the front of the lock cylinder by a ring generally designated 20 encircling the front of the lock body and fixed thereto in any suitable manner such as by tangs 21 bent inwardly behind an enlarged head portion 22 front of the lock body, and which tangs hold a radially inwardly bent wall portion 23 on the ring against the front face of the lock body. Hence, it will be seen that the ring with its wall portion 23 provides a bezel having a central aperture 24 therein of smaller diameter than the cap 16 so that the marginal edge portions of the bezel which define the central aperture therein extend radially inwardly beyond the periphery of the cap and overlie the front side thereof to hold the cap in the well defined by the circumferential rim 15 on the front of the lock cylinder. The ring 20 is preferably also formed of stainless sheet steel of somewhat thinner stock than that of the cap 16, so that the marginal portions thereof which define the central aperture 24 have a degree of resiliency and are capable of slight deflection in a direction axially of the lock cylinder.

According to this invention the cap 16 is connected to the lock cylinder for rotation therewith but without interfering with limited tilting as well as substantially flatwise back and forth motion of the cap axially of the cylinder. For this purpose the cap has circumferentially spaced lugs 26 and 27 bent back from its periphery and engaging shoulders 28 and 29 respectively provided by the opposite sides of the enlarged portion 13 of the key slot in the front of the lock cylinder. These lugs, of course, hold the cap with its key opening in perfect register with the key slot 12 in the cylinder.

The purpose of mounting the cap on the front of the cylinder for tilting and axial motion relative thereto is to enable compression springs 31 seated in diametrically opposite wells 32 opening to the front of the cylinder to act upon the back of the cap and press the same forwardly into self-centering engagement with the bezel, and thus assure firm contact between the convex or spherical front face of the cap and the adjacent edge of the central aperture 24 in the bezel, around the entire circumference of the aperture. To assure this objective the inherent yieldability of the marginal edge portions defining the central aperture in the bezel allows whatever slight flexure of the bezel is necessary to achieve a substantially valve action closure of the cap 16 against the edge of the aperture in the bezel under the force of the compression springs 31.

It is to be noted that the compression springs act upon the cap directly adjacent to the peripheral portions thereof engaged with the bezel, and for this reason the cap is preferably provided with diametrically opposite tangs 34 bent rearwardly from the periphery of the cap and projecting inside the compression springs 31 to act as pilots therefor.

While the engagement between the spherical or convex face of the cap 16 with the adjacent edge of the central aperture 24 in the bezel, characterized by line contact around the entire circumference of said aperture, effectively precludes the ingress of moisture into the lock mechanism at the joint between the bezel and the cap, it is also necessary to guard against water entering the key opening 18 in the cap. For this purpose a shutter 36 is provided to close the key opening 18 in the cap at all times except when the key 11 is inserted into the lock cylinder to actuate the same.

The shutter 36 has a generally rectangularly shaped body 37 with hooks 38 projecting from one side edge of the body near its ends and loosely engaging around a pivot pin 39 anchored in the front end of the cylinder to mount the shutter for swinging motion behind the cap 16 to and from a position engaging the back of the cap to close the key opening 18 therein.

In order to establish the most effective weather proof seal for the key opening 18, the front face of the shutter which engages the back of the cap 16 is formed with the same spherical curvature as the back of the cap, and is held firmly thereagainst by a torsion spring 40. The spring 40 encircles the pivot pin 39 and reacts between one side of the enlarged portion 13 of the key slot and the back of the shutter to firmly but yieldingly hold the shutter in position with the entire front face thereof in intimate surface-to-surface engagement with the back of the cap 16 at those portions thereof adjacent to the key opening 18 in the cap. This intimate surface-to-surface engagement between the shutter and the back of the cap 16 is assured by reason of the fact that the shutter is loosely hinged on the pin 39 and is, therefore, self-adjusting with respect to the rear surface of the cap. Of equal importance, however, is the fact that the force of the spring 40 is applied to the shuttter in such a way as to produce uniform sealing pressure between the contacting surfaces of the cap and shutter entirely around the key opening in the cap. For this purpose the force of the spring is applied to a protuberance 41 on the shutter, projecting from its rear surface and located at the center of the shutter directly in line with the key opening 18 in the cap; and the spring has a medial portion thereof providing an arm 42 which engages the protuberance 41 and thus at all times acts upon the center of the shutter.

Despite its loose hinge connection with the cylinder the shutter is kept well centered with respect to the key opening 18 in the cap by reason of the fact that the close proximity of the remote edges of the shutter hooks 38 to the adjacent side surfaces of the sockets 43 in the cylinder into which the hooks project limits motion of the shutter lengthwise of its hinge axis; while the hooks are held by the pivot pin 39 with their convex outer surfaces closely adjacent to the bottom surfaces of these sockets to limit shifting of the shutter in a direction normal to its hinge axis.

Attention is directed to the fact that the key opening 18 in the cap is located substantially in the central portion of the cap midway between the two pilot tangs 34, and that the torsion spring 40 applies a forward force on the central portion of the cap 16 in the closed position of the shutter, which force augments the force of the compression springs 31 to assure firm engagement of the cap with the edge portions defining the central aperture of the bezel.

As best illustrated in Figure 2 the shutter 36 is readily swung rearwardly away from the back of the cap 16 by the front end of the key 11 as it is inserted into the key opening 18 in the cap, and the enlargement 13 of the cylinder key slot readily accommodates the shutter whenever it is moved to and held in an inoperative position by the key 11.

From the foregoing description taken together with the accompanying drawing it will be readily apparent that the weather sealing means of this invention features simplicity and low cost of manufacture without sacrificing effectiveness.

What I claim as my invention is:

1. Lock mechanism of the character described, comprising: a lock body having a bore the mouth of which opens to the front of the body; a key controlled lock cylinder rotatable in said bore with its front end in the mouth of the bore, and having a key slot accessible from the front of the body; a disc-like cap covering the front of the cylinder and having a key opening therein registering with the key slot in the cylinder; an annular part fixed on the front of the body and providing a bezel having its marginal edge portions defining the central aperture therein extending radially inwardly beyond the periphery of said cap and overlying the front side of the cap to hold the same in position covering the front of the lock cylinder; a shutter mounted on the front portion of the lock cylinder behind said cap for motion toward and from a position engaging the back side of the cap and closing said key opening therein; and spring means engaged with the back of the cap to bias the same forwardly into firm engagement with the edge portions of the central aperture in the bezel to thus provide a moisture proof seal therebetween.

2. Lock mechanism of the character described, comprising: a lock body having a bore the mouth of which opens to the front of the body; a key controlled lock cylinder rotatable in said bore with its front end in the mouth of the bore and having a key slot accessible from the front of the body; an annular part fixed on the front of the body and providing a bezel having its marginal edge portions defining the central aperture therein extending radially inwardly beyond the periphery of the front end of the lock cylinder and overlying the front of the cylinder; means for sealing the aperture in the bezel comprising a disc-like cap confined between the bezel and the front of the lock cylinder to cover the latter, and larger in size than the central aperture in the bezel so that the edge portions defining the aperture in the bezel overlie the front side of the cap a distance inwardly of its periphery to hold the same in position covering the front of the lock cylinder, said cap having a key opening therein registering with the key slot in the cylinder, and spring means in the front portion of the lock cylinder acting upon the cap to urge the same forwardly and thus hold the front side of the cap firmly engaged with the edge portions defining the central aperture in the bezel to preclude the ingress of moisture into the lock mechanism through the bezel aperture; and shutter means mounted on the front of the lock cylinder, behind said cap, for movement to and from a position closing the key opening in the cap.

3. The lock mechanism set forth in claim 2 further characterized by the provision of cooperating means on the cap and the lock cylinder holding the cap against lateral and rotational movement relative to the lock cylinder.

4. The lock mechanism set forth in claim 2 further characterized by the fact that the front side of said disc-like cap is convex so that engagement of the cap with the bezel is restricted to substantially line contact between the convex front of the cap and the adjacent corner of the central aperture in the bezel throughout the entire circumference of said aperture.

5. The lock mechanism set forth in claim 4 wherein the spring means urging said cap forwardly into contact with the bezel comprise diametrically opposite compression springs seated in wells in the lock cylinder opening to the front thereof and confined between the bottoms of said wells and portions of said cap lying closely adjacent to the edge of the central aperture in the bezel.

6. Lock mechanism of the character described, comprising: a lock body having a bore the mouth of which opens to the front of the body; a key controlled lock cylinder rotatable in said bore with its front end in the mouth of the bore, and having a key slot accessible from the front of the body; a disc-like cap covering the front end of the cylinder and having a key opening therein registering with the key slot in the cylinder; an annular part fixed on the front of the body and providing a bezel having its marginal edge portions defining the central aperture therein extending radially inwardly beyond the periphery of said cap and overlying the front side of the cap to hold the same in position covering the front of the cylinder; a shutter mounted on the front portion of the lock cylinder behind said cap for motion toward and from a position engaging the back side of the cap and closing said key opening therein; and means biasing the cap forwardly into engagement with the edge portions of the central aperture in the bezel to provide a moisture proof seal therebetween, said biasing means comprising a spring yieldingly holding the shutter against the back of the cap in position closing the key opening therein.

7. The lock mechanism set forth in claim 6 wherein said biasing means for urging the cap forwardly into engagement with the edge portions of the central aperture in the bezel includes diametrically opposite compression springs confined between the cap and the lock cylinder and cooperating with the shutter spring to maintain the cap in firm engagement with the edge portions defining the central aperture in the bezel.

8. Lock mechanism of the character described, comprising: a lock body having a bore the mouth of which opens to the front of the body; a key controlled lock cylinder rotatable in said bore with its front end in the mouth of the bore, said lock cylinder having diametrically opposite wells therein opening to its front near the periphery thereof, and having a key slot intermediate said wells accessible from the front of the body; a disc-like cap covering the front of the lock cylinder and having a key opening therein registering with the key slot in the cylinder, and diametrically opposite tangs extending rearwardly from its periphery into said wells in the front of the lock cylinder; an annular part fixed on the front of the body and providing a bezel having its marginal edge portions defining the central aperture therein extending radially inwardly beyond the periphery of said cap and overlying the front side of the cap to hold the same in position covering the front of the lock cylinder; a compression spring in each of said wells encircling the tang therein and reacting between the bottom of the well and the back of the cap to press the cap forwardly and effect firm engagement of the front side thereof with the edge portions of the central aperture in the bezel around the entire circumference of said bezel to provide a moisture proof seal between the cap and the bezel; and shutter means mounted on the lock cylinder behind said cap and closing the key opening therein, said shutter means being movable away from said opening by insertion of a proper key through the opening and into the key slot in the cylinder.

9. Lock mechanism of the character described, comprising: a lock body having a bore the mouth of which opens to the front of the body; a key controlled lock cylinder rotatable in said bore with its front end in the mouth of the bore and having a key slot accessible from the front of the body; a forwardly projecting circumferential rim on the front of the lock cylinder adjacent to its periphery; a disc-like cap shaped to substantially fit inside said circumferential rim and held thereby coaxially with the lock cylinder in a position covering the front of the cylinder, said cap having a key opening substantially medially therein registering with the key slot in the cylinder; cooperating driving abutments on said cap and the cylinder constraining the cap to rotate with the cylinder; an annular part fixed on the front of the body and providing a bezel having its marginal edge portions defining the central aperture therein extending radially inwardly beyond the periphery of said cap and overlying the front side of the cap to hold the same on the front of the cylinder and inside said circumferential rim thereon; a shutter mounted on the front of the lock cylinder behind said cap for motion toward and from a position engaging the back side of the cap and closing the key opening therein; and biasing means urging the cap forwardly to effect engagement of the front face thereof with the edge portions defining the aperture in the bezel so as to provide a moisture proof seal between the bezel and the cap, said means comprising a spring acting upon the shutter to hold the same pressed against the back of said cap and thus exerting a forward force upon the cap at an area thereof spaced radially inwardly from the marginal edge portions defining the central aperture of the bezel.

10. Lock mechanism of the character described, comprising: a lock body having a bore the mouth of which opens to the front of the body; a key controlled lock cylinder rotatable in said bore with its front end in the mouth of the bore, and having a key slot accessible from the front of the body; means on the front of the lock cylinder defining a forwardly projecting circumferential rim thereon adjacent to the periphery of the front end of the cylinder; a relatively rigid disc-like cap covering the front end of the lock cylinder and confined inside said rim to be held thereby against shifting laterally relative to the cylinder, said cap having a key opening therein registering with the key slot in the cylinder; an annular part of relatively light weight sheet metal fixed on the front part of the body and providing a bezel having its marginal edge portions defining the central aperture therein extending radially inwardly beyond the periphery of said cap and overlying the front side thereof to hold the cap confined inside said circumferential rim on the lock cylinder; shutter means mounted on the lock cylinder behind the cap for motion to and from a position engaging the back of the cap and closing the key opening therein; and spring means acting upon the cap at circumferentially spaced points adjacent to the periphery thereof for urging the cap forwardly aaginst the marginal edge portions defining the central aperture in the bezel, the front face of said cap having a relatively large radius spherical configuration and the central portions of said front face projecting slightly through the central aperture of the bezel to assure engagement of said spherical surface with the edge of the central aperture in the bezel around the entire circumference of the aperture under the influence of said spring means so as to assure a moisture proof seal between the cap and the bezel.

11. Lock mechanism of the character described, comprising: a lock body having a bore opening to the front of the body; a lock cylinder rotatable in said bore and having an axial key slot therein; and means providing a weather seal for the front of the lock mechanism, comprising a disc-like cap covering the front end of the cylinder and providing in effect a valve member, said cap having a key opening therein registering with the key slot in the cylinder, a valve seat member carried by the lock body and having a ring-like part encircling the front end of the lock cylinder, an annular flange on said ring-like part extending radially inwardly therefrom, the inner edge portions of the flange overlying the front of the cap a distance inwardly of the periphery thereof and providing in effect a valve seat for the cap, one of said members being movable axially of the cylinder, spring means engaging and acting upon said movable member of the seal means and urging the same toward the other of said members to effect firm engagement of said flange with the front of the cap around the entire circumference of the inner edge portions of the flange to thus preclude the entrance of moisture into the lock mechanism past the joint between the flange and cap, and shutter means on the cylinder, behind said cap, movable to and from a position closing the key opening in the cap.

12. Lock mechanism of the character described, comprising: a rotatable lock cylinder having a key slot opening to the front thereof, the mouth of said slot being enlarged at one side thereof to provide a shutter receiving cavity; a cap carried by the lock mechanism overlying the front face of the cylinder and closely adjacent thereto, said cap having a key opening registering with the key slot in the cylinder, which key opening is closely conformed in shape and size to the cross section of a key to be admitted so as to guide the key into the key slot in the cylinder and so that said cap substantially covers the enlarged mouth of the key opening; a shutter in said cavity behind the cap of a size to cover the key opening in the cap, and shape to have intimate engagement with the back of the cap; a pair of spaced apart, coaxial, loose hinge connections between one edge portion of the shutter and the cylinder, in the enlarged mouth of the key slot, by which the shutter is supported for pivotal motion about an axis which is normal to the cylinder axis and disposed to one side of the key opening in the cap and behind the front face of the cylinder, whereby the shutter may be swung to and from an operative position against the back of the cap and is self-adjusting flatwise on its loose hinge connections so that it can intimately engage the back of the cap entirely around the key opening therein in the operative position of the shutter; and spring means mounted on the front of the lock cylinder and reacting between the cylinder and the shutter to yieldingly hold the shutter in its operative position closing the key opening in the cap.

13. The lock mechanism set forth in claim 12 further characterized by the fact that said shutter is provided with a protuberance on its rear located centrally of the shutter and in line with the key opening in the cap; and wherein said spring means is a torsion spring having an arm which engages said protuberance on the back of the shutter so that the spring force is applied to a localized central area on the shutter and therefore is substantially equally distributed around the marginal portions of the shutter which engage the back of the cap.

14. Lock mechanism of the character described, comprising: a lock body having a bore opening to the front of the body; a lock cylinder rotatable in said bore and having an axial key slot therein; and seal means for the front of the lock mechanism comprising a disc-like cap element covering the front end of the cylinder and having a key opening therein registering with the key slot in the cylinder, a ring-like element carried by the body and encircling the front end of the lock cylinder, an annular flange on said ring-like element extending radially inwardly therefrom over the front of said cap element, means on the lock mechanism engaging and exerting upon one of said elements a yielding force axially of the lock cylinder biasing said one element toward the other element to hold said flange and the cap element in firm engagement with one another around the entire inner edge of said flange, and shutter means on the front of the cylinder behind the cap element, movable to and from a position closing the key opening in the cap element.

References Cited in the file of this patent

UNITED STATES PATENTS

| Number | Name | Date |
|---|---|---|
| 583,905 | Hillhouse et al. | June 8, 1897 |
| 914,669 | Pfleghar | Mar. 9, 1909 |
| 952,643 | Roche | Mar. 22, 1910 |
| 1,965,942 | Jacobe | July 10, 1934 |
| 2,036,738 | Zygmunt | Apr. 7, 1936 |
| 2,076,004 | Ringseis | Apr. 6, 1937 |
| 2,261,472 | Hurd | Nov. 4, 1941 |